July 5, 1960  T. A. McCOY  2,943,724
FEED CONTROL MECHANISM FOR ARTICLE CONVEYORS
Filed Oct. 30, 1958  4 Sheets-Sheet 2

INVENTOR.
Thomas R. McCoy
BY
Webster & Webster
ATTYS.

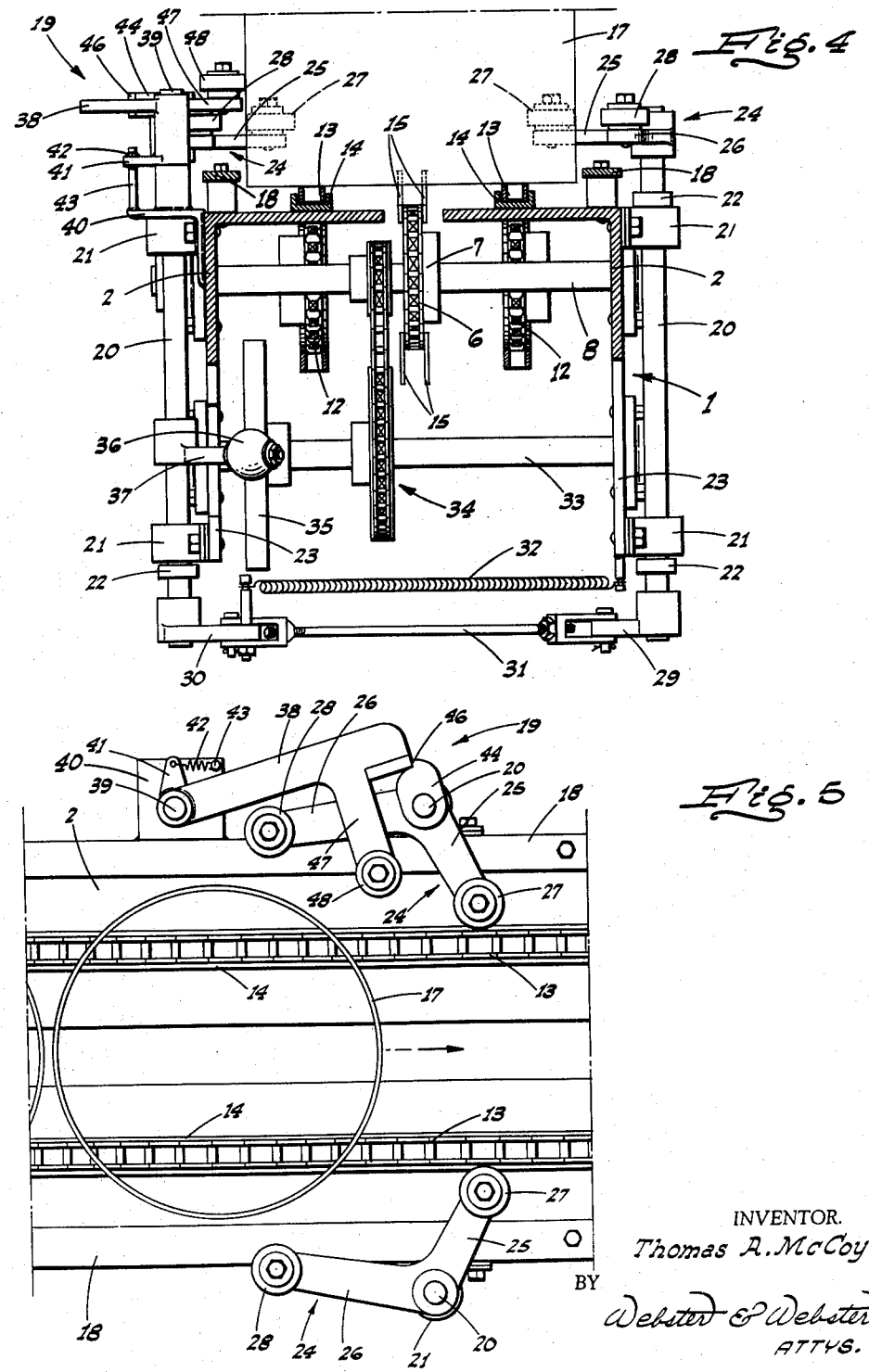

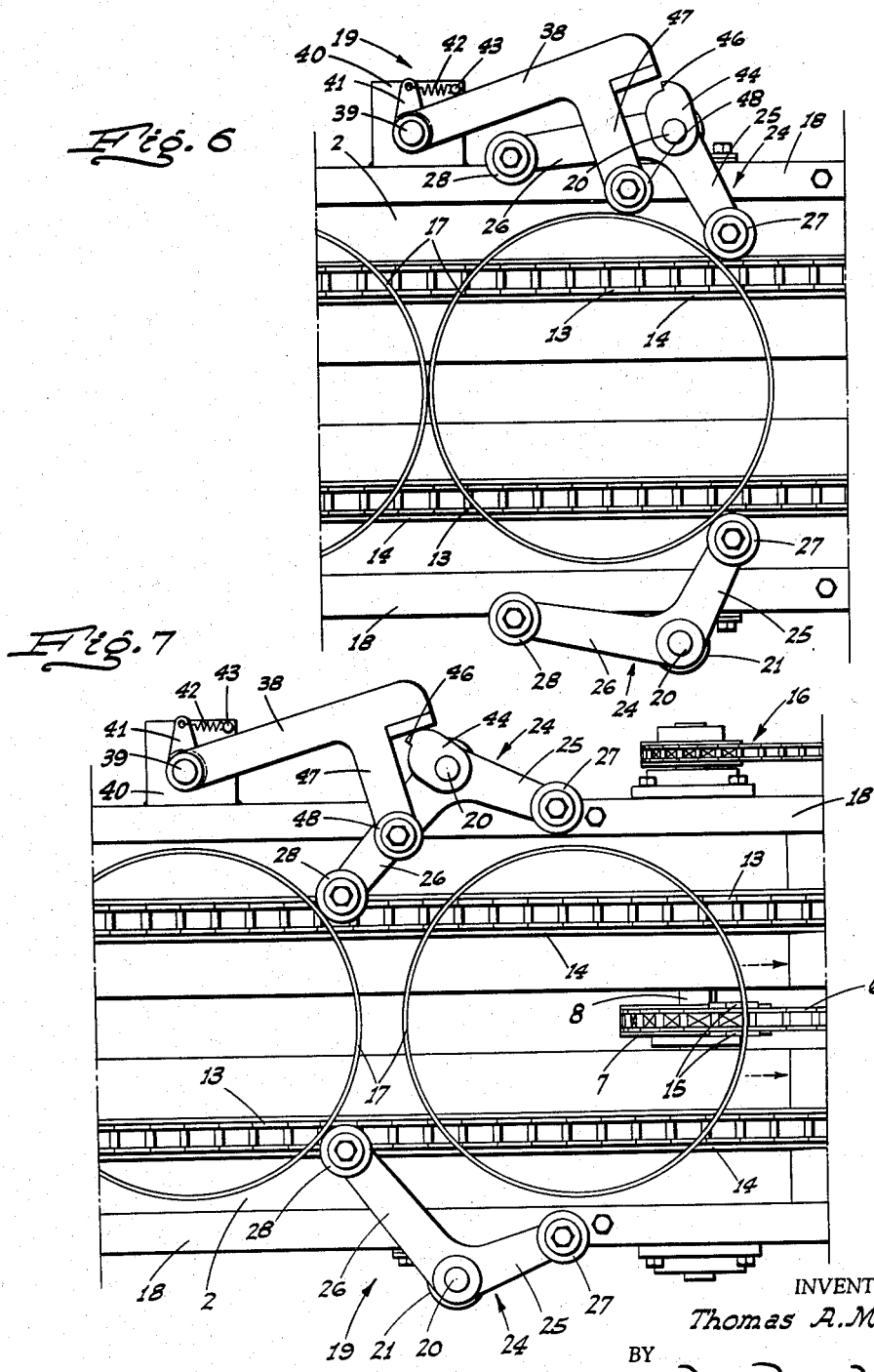

United States Patent Office 2,943,724
Patented July 5, 1960

2,943,724

FEED CONTROL MECHANISM FOR ARTICLE CONVEYORS

Thomas A. McCoy, Stockton, Calif., assignor to Caranda Machine Works, Stockton, Calif., a partnership Filed Oct. 30, 1958, Ser. No. 770,690

9 Claims. (Cl. 198—34)

This invention is directed to, and it is a major object to provide a novel feed control mechanism for articles supported in single-file or row order on—and advanced by—a conveyor; the mechanism being operative, at one point in the length of the conveyor, to successively engage and then release the individual articles in a manner to impart predetermined longitudinal spacing thereto as fed forwardly beyond said point. The purpose of such longitudinal spacing of the articles is to properly index them for successive delivery to—and reception by—a cyclically functioning machine which conducts further manufacturing operations on said articles.

Another object of the invention is to provide a feed control mechanism, as above, which is operative regardless of the longitudinal spacing of the articles as initially deposited on the conveyor.

A further object of the invention is to provide a feed control mechanism which includes a novel arrangement to restrain each individual article, of the row, at said release point until a predetermined time has elapsed following release of the article immediately ahead, and to thus accomplish the desired spacing of said articles; there being means to automatically block and hold back the immediately following article during the release of each individual article at said point. The conveyor, upon which the row of articles is supported, continues to travel and slips beneath the articles so restrained or blocked.

A still further object of the invention is to provide a feed control mechanism, as in the preceding paragraph, which is constructed to function to release an individual article at said point only if one of said articles occupies a position at such point when said predetermined time (or one or more occurrences thereof) has elapsed, whereby the predetermined spacing (or a multiple thereof) is always maintained.

An additional object of the invention is to provide a feed control mechanism, for the purpose described, which is especially designed—but not limited—for use in connection with cylindrical metallic drum (or pail) bodies carried in upstanding position in said single-file or row order on the conveyor.

It is also an object of the invention to provide a feed control mechanism which is designed for smooth and positive operation even at relatively high conveyor speed, and yet a mechanism which is relatively simple in its structure.

Still another object of the invention is to provide a practical, reliable, and durable feed control mechanism for article conveyors, and one which will be exceedingly effective for the purpose for which it is designed.

These objects are accomplished by means of such structure and relative arrangement of parts as will fully appear by a perusal of the following specification and claims.

In the drawings:

Fig. 4 is a transverse vertical sectional elevation taken on line 4—4 of Fig. 2.

Fig. 5 is a plan view of the feed control mechanism; the view showing the position of the illustrated parts immediately prior to engagement with a drum body advancing toward the same.

Fig. 6 is a similar view, but shows the position of such parts after engagement with said drum body, and while the latter is being restrained, at the release point, from advancing movement.

Fig. 7 is likewise a similar view, but shows the position of such parts upon release of said drum body, and at which time the next following drum body is blocked against advancing movement to said release point.

Figure 1:
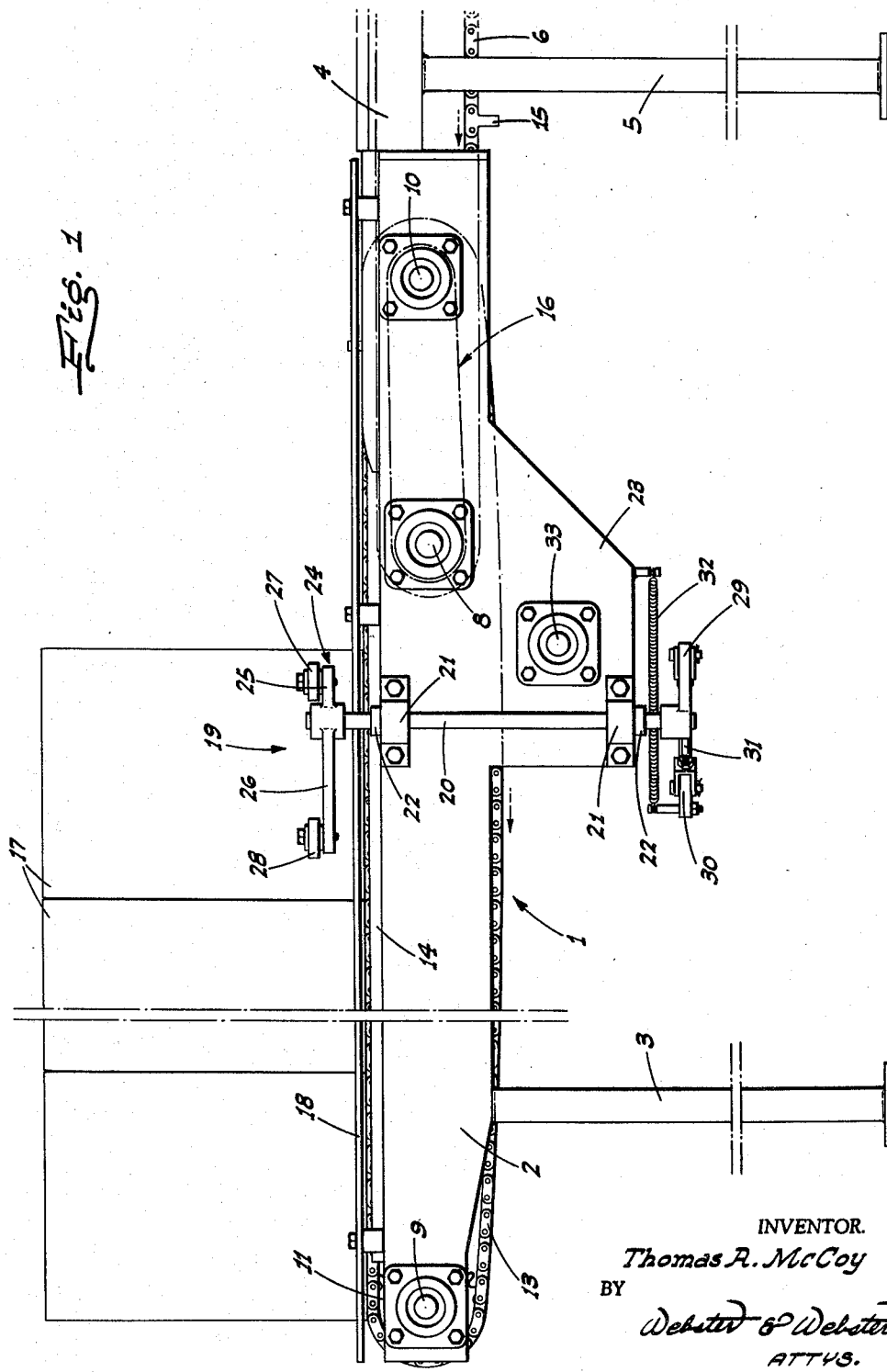
Fig. 1 is a side elevation, foreshortened, of a drum body conveyor embodying the feed control mechanism of the present invention.
Figure 2:
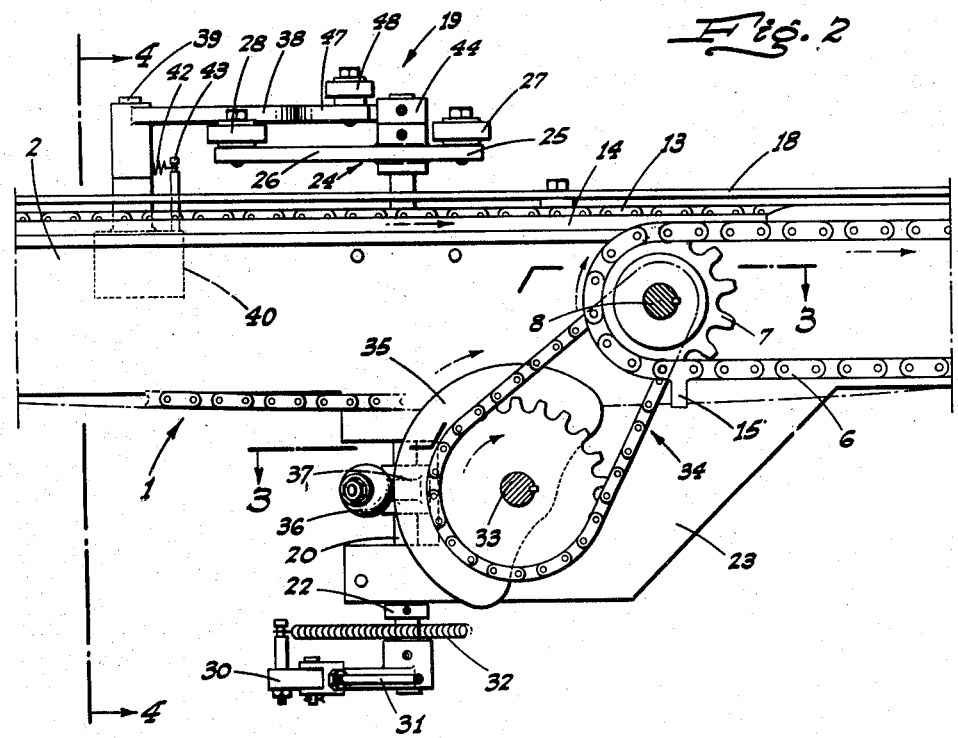
Fig. 2 is a fragmentary, substantially central longitudinal sectional elevation taken through the feed control mechanism.

Referring now more particularly to the drawings, and to the characters of reference marked thereon, the feed control mechanism of the present invention is mounted in connection with a conveyor, indicated generally at 1, which includes a longitudinal frame 2 supported adjacent its rear end by a leg structure 3, and attached at its forward end to the rear end of a machine to which the articles (here drum or pail bodies) are to be fed; such machine being shown in part at 4, and whose rear end is supported by a leg structure 5.

The machine 4—whose purpose is to conduct a manufacturing operation on drum bodies as successively fed thereto in predetermined longitudinally spaced relation—includes a driven, endless conveyor chain 6 which is disposed centrally and longitudinally of the machine 4, and extends rearwardly a distance into the frame 2; the conveyor chain 6 being trained about a sprocket 7 on a cross shaft 8 journaled in the longitudinal frame 2 a distance rearwardly of the front end thereof, but ahead of the central portion of said frame.

The conveyor chain 6 is driven in a direction so that the upper run thereof travels forwardly; i.e., from the sprocket 7 in the direction of the machine 4. The details of said machine 4 comprise no part of the present invention.

The frame 2 is fitted, adjacent its ends, with a rear cross shaft 9 and a front cross shaft 10; said cross shafts 9 and 10 being each fitted with a pair of transversely spaced sprockets; the rear sprockets being indicated at 11, and the front sprockets at 12.

Endless conveyor chains 13 are trained about—and extend between—corresponding ones of the rear sprockets 11 and the front sprockets 12; the upper runs of said chains 13 being carried in longitudinal guide channels 14 fixed in connection with the frame 2.

With the above described arrangement the rear portion of the endless conveyor chain 6 is disposed centrally between the forward portions of the endless conveyor chains 13; said chain 6 being fitted with outwardly projecting lugs 15 having equal and predetermined longitudinal spacing therebetween. The lugs 15—when in the upper run of said chain 6—project above the horizontal plane of the endless conveyor chains 13 (see Fig. 4).

The endless conveyor chains 13 are simultaneously driven in a direction such that the upper runs of said chains travel forwardly; the drive being accomplished by an endless chain and sprocket unit 16 connected between the cross shaft 8 and the cross shaft 10 at corresponding ends thereof outside the frame 2.

The conveyor 1 is adapted to receive—on the rear end portion thereof, and in supported relation on the endless conveyor chains 3—a row of upstanding, openended, metallic drum (or pail) bodies 17 in single-file order, but without regard to the longitudinal spacing of said drum bodies.

The drum bodies 17 are advanced forwardly on the conveyor 1 by the endless conveyor chains 13; such chains however being smooth-surfaced so that they may slip under any drum body that is stopped in its advance by the feed control mechanism, to be hereinafter described.

The longitudinal row of drum bodies 17 is guided lengthwise on conveyor 1 by means of transversely spaced, elevated, longitudinal guide rails 18 whose spacing is only slightly greater than the diameter of the drum bodies 17; all of the drum bodies being of like diameter.

The purpose of the present invention is to deliver the drum bodies 17 from the conveyor 1 to the machine 4 with equal spacing (or a multiple of such spacing), and to accomplish this result irrespective of the spacing of the drum bodies 17 as initially deposited on the rear end portion of said conveyor 1.

The attainment of such result is accomplished by a feed control mechanism, indicated at 19, and which comprises the following:

Adjacent but rearwardly of the cross shaft 8 the frame 2 is fitted—on each side, and exteriorly thereof—with a vertical spindle 20; such spindles being journaled in connection with the frame, as at 21. The spindles 20 are maintained against vertical displacement by collars 22, and said spindles project at their upper ends above the top of the frame 2, and similarly project at their lower ends below drop-center portions 23 of said frame.

At their upper ends, and for swinging motion in a horizontal plane above the guide rails 18, the vertical spindles 20 are each fitted with a bellcrank, indicated generally at 24; each such bellcrank—by reference to its normal or initial position—including a forwardly and inwardly diagonaling front leg 25, and a rearwardly and inwardly diagonaling rear leg 26. Such legs 25 and 26 are fitted at their free ends with vertical-axis rollers, indicated at 27 and 28, respectively.

The length and angular disposition of the legs 25 and 26 of each bellcrank 24 are such that when said bellcranks are in their normal or initial position the rollers 27 are transversely spaced a distance less than the diameter of the drum bodies 17 which advance on the endless conveyor chains 13, while the rollers 28 are transversely spaced a greater distance than said diameter.

At their lower ends, and below the drop-center portions 23 of frame 2, the spindles 20 are each fitted with a radial lever arm; one being shown at 29 and the other at 30 (see Fig. 3). The radial lever arm 29 normally or initially extends forwardly at an inward diagonal, while the lever arm 30 extends rearwardly at an inward diagonal; said lever arms 29 and 30 being connected together by a pivotally attached tie rod 31 which extends between the outer end portions of said lever arms. This serves to connect the lever arms 29 and 30 for swinging movement in unison.

Figure 3:
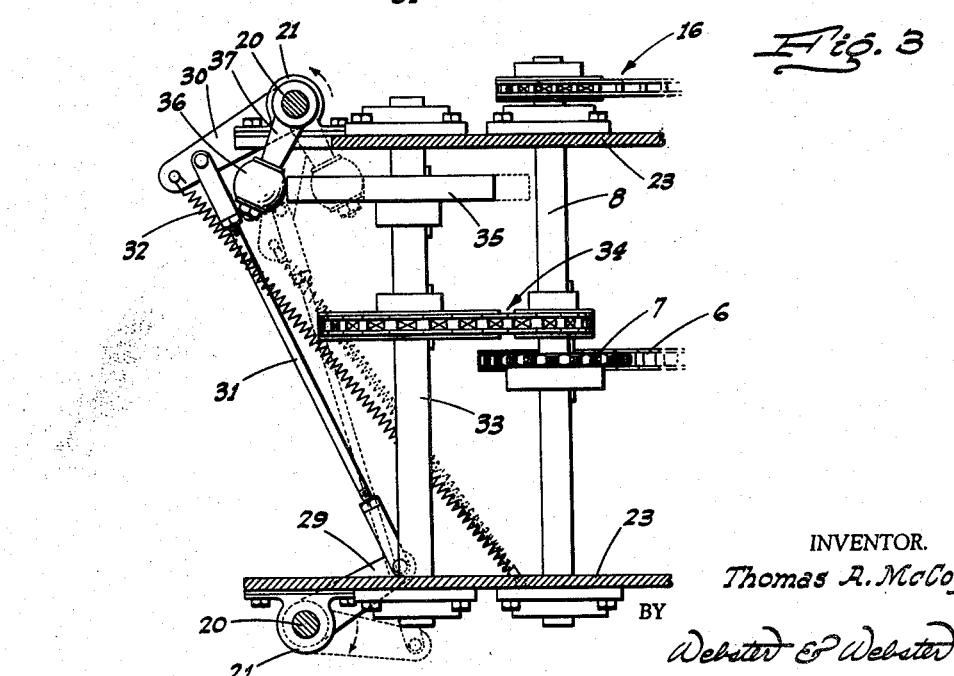
Fig. 3 is a fragmentary sectional plan view, taken on line 3—3 of Fig. 2.

A tension spring 32 is connected between the outer end of the radial lever arm 30 and a forward point on the opposite side of the frame 2; such tension spring 32 thus tending to cause simultaneous swinging of the lever arms 29 and 30 so as to impart rotation to the spindles 20 in the direction indicated by the arrows in Fig. 3, and which would result in the bellcranks 24 being turned so that the front legs 25 swing laterally outwardly, while the rear legs 26 swing laterally inwardly.

However, the lever arms 29 and 30, in normal operation, are caused to oscillate in a cycle of predetermined time by means of the following cam actuated instrumentality;

A cross shaft 33 is journaled in the frame 2 between the drop-center portions 23 thereof rearwardly and below the cross shaft 8; said cross shaft 33 being driven from cross shaft 8 by an endless chain and sprocket unit 34.

A rotary cam 35 is fixed on cross shaft 30 adjacent but inwardly of one of the drop-center portions 23 of frame 2, and a roller 36 rides the periphery of the cam 35; such roller 36 being journaled on the outer end of a radial arm 37 which projects from the near spindle 20. The radial arm 37, when the roller 36 is riding the lobe of the rotary cam 35, extends at a rearward and inward diagonal, but extends at a forward and inward diagonal when said roller rides the drop-off portion of said cam. The rotary cam 35 is generated so as to cause—through the medium of the roller 36 and radial arm 37, in cooperation with the lever arms 29, 30, and spring 32—recurrent and timed oscillating movement of the spindles 20.

More particularly, when the roller 36 is riding the lobe of the rotary cam 35, the bellcranks 24 are swung to their initial or normal position, with the front legs 25 and rear legs 26 positioned as in Fig. 5, and when the roller 36 transfers to the drop-off portion of said cam the bellcranks are swung to their alternate position with the front legs 25 and 26 positioned as in Fig. 7.

Thus, with rotation of the rotary cam 35, the bellcranks 24 recurringly and in timed relation oscillate between the position shown in Fig. 5 and the position shown in Fig. 7; all for the purpose hereinafter described.

A horizontal, generally longitudinally extending latch bar 38 is pivoted, as at 39, on a bracket 40 which is secured to—and projects laterally outwardly from—the frame adjacent but rearwardly of one of the bellcranks 24; such latch bar 38 being disposed outwardly of—and in a plane above—the rear leg 26 of said adjacent bellcrank 24. At its rear end the latch bar 38 is provided with a laterally outwardly projecting ear 41 to which a forwardly extending tension spring 42 is connected; the forward end of said spring 42 being anchored to the bracket 40, as at 43. The spring 42 thus tends to swing the latch bar 38 laterally inwardly.

At its forward end the latch bar 38 engages a horizontal rotary cam or stop 44 fixed on the upper end of the adjacent spindle 20 and above the related bellcrank 24; such cam 44 including a rearwardly facing latch shoulder 46 against which the forward end of the latch bar 38 normally abuts. With the latch bar 38 engaging the latch shoulder 46 of cam 44, the bellcranks 24 are held in their initial or normal position irrespective of the functioning of the rotary cam 35 and roller 36.

The latch bar 38 includes—in integral relation, and intermediate its ends—a laterally inwardly extending trigger finger 47 fitted at its free end with a vertical-axis roller 48. The roller 48 is disposed in the path of movement of the adjacent side of each drum body 17 as advanced by the endless conveyor chains 13.

Operation

As each drum body 17 advances on the conveyor chains 13, such drum body engages the roller 48 and swings the latch bar 38 outwardly so as to disengage said bar from the latch shoulder 46; the drum body then advancing until it engages and is arrested in its forward motion by the rollers 27 on the front legs 25 of bellcranks 24 (see Fig. 6).

The drum body thus arrested remains stationary, with the chains 13 slipping thereunder, until the roller 36 next rides off the lobe of the rotary cam 35 and transfers to the drop-off portion of said cam. When this occurs, the bellcranks 24 are simultaneously part-circle rotated so as to swing the front legs 25 outwardly and the rear legs 26 inwardly. The out-swinging of the front legs 25 is sufficient to permit the release and continued forward motion of the previously engaged drum body 17, and at the same time the rollers 28—as they swing inwardly—strike such drum body on opposite sides and rearwardly of the center, whereby to accelerate said drum body to approximately the speed of the conveyor chains 13.

The rollers 28—when the rear legs 26 are swung inwardly, and upon the release and resumption of forward travel of the leading drum body 17—are engaged by, and block continued forward motion of, the next following drum body (see Fig. 7).

Thereafter, and when the roller 36 again rides onto the lobe of the rotary cam 35, the bellcranks 24 are returned to their initial or normal position, whereupon the drum body 17 as blocked by the rollers 28 is released therefrom and travels forwardly until it is engaged by the rollers 27, and is thus again restrained from forward travel until the bellcranks 24 next swing from the position of Fig. 5 to the position of Fig. 7.

This cycle repeats for each drum body 17 advanced to the feed control mechanism 19 by the conveyor chains 13, and in this way such drum bodies are equally spaced by timed release, as fed forwardly from said mechanism.

As each drum body 17 is released by the feed control mechanism 19, and resumes travel on the endless conveyor chains 13, such drum body is engaged on the inside—at the front and bottom—by a set of the lugs 15 on endless conveyor chain 6; such chain 6 feeding the drum bodies 17 to the machine 4, while maintaining the same longitudinal spacing between said drum bodies as attained by operation of the feed control mechanism 19. The various chain conveyor and shaft speeds are inter-related in a manner to accomplish the result with the proper timing.

Should the feed control mechanism 19 release a drum body 17 for continuance of its forward travel without there being an immediately following drum body on the conveyor chains 13, the latch bar 38 will remain in engagement with the latch shoulder 46 of cam 44, which locks the bellcranks 24 against movement until a drum body 17 is subsequently advanced into engagement with the roller 48. When this occurs, the latch bar 38 is swung outwardly to unlock the bellcranks, and such subsequently advancing drum body then runs against—and is arrested by—the rollers 27 to await the next cyclic and drum releasing operation of said bellcranks 24. Under the circumstance just described, there will be a skip in the row of drum bodies released by the feed control mechanism 19, but a multiple of the predetermined spacing will be maintained so as to prevent a jam, due to improper spacing, in the machine 4.

From the foregoing description it will be readily seen that there has been produced such a mechanism as will substantially fulfill the objects of the invention, as set forth herein.

While this specification sets forth in detail the present and preferred construction of the mechanism, still in practice such deviations therefrom may be resorted to as do not form a departure from the spirit of the invention, as defined by the appended claims.

Having thus described the invention, the following is claimed as new and useful, and upon which Letters Patent are desired:

1. A feed control mechanism for a conveyor unit which includes a frame and a longitudinal conveyor on the frame adapted to support and advance a row of articles, the conveyor being operative to slip beneath each article upon arrest of the forward travel of the latter; said mechanism comprising a stop member, means mounting the stop member on the frame for movement between an initial position in the path of travel of said articles and another position clear of said path, the articles as advanced on the conveyor being individually and successively engaged and arrested by said stop member in said initial position, timed means operative to recurringly oscillate the stop member between said positions whereby to successively release the arrested articles so as to impart predetermined spacing therebetween upon continued forward travel on the conveyor, and means operative by an article to be engaged and arrested to prevent such oscillation of the stop member until such article occupies a closely adjacent position on the conveyor.

2. A feed control mechanism for a conveyor unit which includes a frame and a longitudinal conveyor on the frame adapted to support and advance a row of articles, the conveyor being operative to slip beneath each article upon arrest of the forward travel of the latter; said mechanism comprising a horizontally disposed bellcrank having a front leg and a rear leg, means rotatably mounting the bellcrank on the frame for movement between an initial position with the front leg in the path of travel of said articles and the rear leg clear of said path, and another position with the rear leg in said path and the front leg clear thereof; timed means operative to recurringly oscillate the bellcranks between said positions whereby the front leg alternately arrests and releases the articles individually and in succession so as to impart predetermined spacing therebetween upon continued forward travel on the conveyor, and the rear leg arrests any immediate following article during release of each article by said front leg; initially engaged but releasable latch means between the frame and the bellcrank arranged to prevent such oscillation of the latter, and means operative by an article to be engaged and arrested to release said latch means upon such article occupying a position closely adjacent the front leg.

3. A feed control mechanism, as in claim 2, in which the latch means includes a movable element, and said release means comprises a trigger finger on said element projecting into the path of such approaching article, the latter engaging such finger to cause movement of said element in a latch releasing direction.

4. A feed control mechanism, as in claim 3, in which the trigger finger projects laterally inwardly intermediate the front and rear legs of the bellcrank.

5. A feed control mechanism for a conveyor unit which includes a frame and a longitudinal conveyor on the frame adapted to support and advance a row of articles, the conveyor being operative to slip beneath each article upon arrest of the forward travel of the latter; said mechanism comprising a horizontally disposed bellcrank having a front leg and a rear leg, means rotatably mounting the bellcrank on the frame for movement between an initial position with the front leg in the path of travel of said articles and the rear leg clear of said path, and another position with the rear leg in said path and the front leg clear thereof; timed means operative to recurringly oscillate the bellcranks between said positions whereby said legs alternately occupy article arresting positions, such timed means being arranged to permit latching of the bellcrank in said initial position, initially engaged but releasable means latching the bellcrank in said initial position, and means responsive to an approaching article occupying a predetermined position relative to the bellcrank operative to release said latch means.

6. A feed control mechanism for a conveyor unit which includes a frame and a longitudinal conveyor on the frame adapted to support and advance a row of upstanding cylindrical articles, the conveyor being operative to slip beneath each article upon arrest of the forward travel of the latter; said mechanism comprising an upstanding spindle journaled on the frame laterally of the conveyor, a laterally inwardly facing bellcrank fixed on the spindle for horizontal movement thereby in a plane above the conveyor but with their ends movable into the path of articles thereon, the bellcrank having a front leg and a rear leg, elements on the ends of the legs for alternate engagement with the side of each article, and timed means applied to the spindle to recurringly oscillate the same through a stroke of predetermined length; the bellcrank legs being arranged so that the element on the front leg will engage the side of an article ahead of the transverse center thereof upon movement of the bellcrank in one direction, and the element on the rear leg will subsequently engage the side of such article back of the transverse center thereof after the front leg element moves clear of the article but before the bellcrank reaches the end of such movement whereby to impart forward movement to the article with the completion of the bellcrank movement in said direction.

7. A feed control mechanism for a conveyor unit which includes a frame and a longitudinal conveyor on the frame adapted to support and advance a row of articles, the conveyor being operative to slip beneath each article upon arrest of the forward travel of the latter; said mechanism comprising an upstanding spindle journaled on the frame laterally of the conveyor, a stop leg fixed on the spindle in a plane above the conveyor, said stop leg projecting from the spindle for movement thereby between an initial position in the path of travel of said articles and another position clear of said path, the articles as advanced on the conveyor being individually and successively engaged and arrested by the stop leg in said initial position, means to recurringly oscillate the stop leg between said positions, initially engaged releasable latch means between the frame and stop leg preventing oscillating movement of the stop leg from said initial position, and means included with the latch means for engagement by an advancing article to release the latch means before such article reaches the stop leg.

8. A feed control mechanism for a conveyor unit which includes a frame and a longitudinal conveyor on the frame adapted to support and advance a row of articles, the conveyor being operative to slip beneath each article upon arrest of the forward travel of the latter; said mechanism comprising an upstanding spindle journaled on the frame laterally of the conveyor, a stop leg fixed on the spindle in a plane above the conveyor, said stop leg projecting from the spindle for movement thereby between an initial position in the path of travel of said articles and another position clear of said path, the articles as advanced on the conveyor being individually and successively engaged and arrested by the stop leg in said initial position, means to recurringly oscillate the stop leg between said positions, a stop element rigid with and projecting laterally out from the spindle, a latch bar projecting lengthwise of and laterally offset from the conveyor rearwardly of the stop element, means pivoting the bar at its rear end on the frame, the bar at its forward end normally engaging the stop element in holding relation to prevent rotation of the spindle in a direction to move the stop leg clear of the path of an article, and means provided with the latch bar for engagement by an approaching article and so that the bar will be swung laterally out and clear of the stop element before the article reaches the stop leg.

9. A structure, as in claim 8, in which said last named means comprises a trigger finger rigid with and projecting the latch bar transversely of the conveyor, and a roller on the outer end of the finger projecting into the path of movement of the article when the latch bar is engaged with the stop element.

References Cited in the file of this patent

UNITED STATES PATENTS

| | | |
|---|---|---|
| 1,508,369 | Johnson | Sept. 9, 1924 |
| 1,676,978 | Bohn | July 10, 1928 |
| 2,047,406 | Copping | July 14, 1936 |
| 2,338,267 | Stewart | Jan. 4, 1944 |
| 2,630,260 | Tracy | Mar. 3, 1953 |

UNITED STATES PATENT OFFICE

CERTIFICATE OF CORRECTION

Patent No. 2,943,724

July 5, 1960

Thomas A. McCoy

It is hereby certified that error appears in the above numbered patent requiring correction and that the said Letters Patent should read as corrected below.

In the grant, lines 2 and 12, and in the heading to the printed specification, lines 4 and 5, name of assignee, for "Caranda Machine Works", each occurrence, read -- Carando Machine Works --.

Signed and sealed this 6th day of December 1960.

(SEAL)
Attest:

KARL H. AXLINE
Attesting Officer

ROBERT C. WATSON
Commissioner of Patents